(12) United States Patent
Cheng et al.

(10) Patent No.: US 8,659,910 B2
(45) Date of Patent: Feb. 25, 2014

(54) LOCKING MECHANISM AND ELECTRONIC DEVICE HAVING THE SAME

(75) Inventors: Wen-Chieh Cheng, New Taipei (TW); Yao-Ting Lee, New Taipei (TW); Yi-Chieh Luo, New Taipei (TW)

(73) Assignee: Wistron Corporation, New Taipei (TW)

( * ) Notice: Subject to any disclaimer, the term of this patent is extended or adjusted under 35 U.S.C. 154(b) by 133 days.

(21) Appl. No.: 13/372,736

(22) Filed: Feb. 14, 2012

(65) Prior Publication Data
US 2012/0243197 A1 Sep. 27, 2012

(30) Foreign Application Priority Data

Mar. 21, 2011 (TW) .............................. 100109533 A

(51) Int. Cl.
*H05K 7/14* (2006.01)
*H05K 7/18* (2006.01)

(52) U.S. Cl.
USPC .......................................... 361/801; 361/755

(58) Field of Classification Search
USPC .......... 361/679.02, 679.33, 679.35, 730, 752, 361/755, 759, 796, 800–803
See application file for complete search history.

(56) References Cited

U.S. PATENT DOCUMENTS

| | | | | |
|---|---|---|---|---|
| 4,422,222 A | * | 12/1983 | Notoya | 24/614 |
| 5,724,704 A | * | 3/1998 | Seo | 16/254 |
| 6,107,702 A | * | 8/2000 | Bilac et al. | 307/125 |
| 6,735,698 B1 | * | 5/2004 | Callam | 726/35 |
| 7,265,739 B2 | * | 9/2007 | Yim | 345/82 |
| 7,489,502 B2 | * | 2/2009 | Hong et al. | 361/679.55 |
| 2006/0050474 A1 | * | 3/2006 | Kusaka et al. | 361/683 |
| 2006/0256516 A1 | * | 11/2006 | Cho | 361/683 |

* cited by examiner

*Primary Examiner* — Hung S Bui
(74) *Attorney, Agent, or Firm* — Nixon & Vanderhye, PC

(57) ABSTRACT

A locking mechanism includes a housing, a hinge, a fastening member, and an actuating member. The housing defines a receiving space therein and is formed with a through hole. The hinge includes a connecting support disposed in the receiving space and a rotary member operable to pivot relative to the connecting support, and having an engaging segment. The fastening member is disposed in the receiving space, is registered with the through hole, and is formed with an engaging slot for engaging the engaging segment. The actuating member removably extends into the through hole and is operable to actuate the fastening member to move between locked and unlocked positions, where the engaging segment and the engaging slot are engageable and non-engageable, respectively.

16 Claims, 16 Drawing Sheets

LOCKING MECHANISM AND ELECTRONIC DEVICE HAVING THE SAME

CROSS-REFERENCE TO RELATED APPLICATION

This application claims priority of Taiwanese Application No. 100109533 filed on Mar. 21, 2011, the disclosure of which is incorporated herein by reference.

BACKGROUND OF THE INVENTION

1. Field of the Invention

The present invention relates to a locking mechanism and an electronic device having the locking mechanism, more particularly to a locking mechanism capable of locking a display screen of a notebook computer on a housing of the notebook computer.

2. Description of the Related Art

Fingerprint identification and booting system are usually employed to realize secure use of a notebook computer by its owner.

A mechanical locking mechanism, such as that disclosed in Taiwanese Utility Model No. 295420, may also be employed to protect a notebook computer from unauthorized use. In said Taiwanese Utility Model No. 295420, a notebook computer comprises an engaging device having a hook and a groove formed respectively on top and bottom housing parts of the notebook computer. The locking mechanism is disposed adjacent to the engaging device on a side edge of the notebook computer for prohibiting disengagement of the hook from the groove to thereby prevent unauthorized use of the notebook computer. The locking mechanism, comprises a key, a keyhole, and a block member. The key removably extends into the keyhole to rotate the block member between a locked position, where the block member engages the groove to prohibit disengagement of the hook from the groove, and an unlocked position, where the block member disengages the groove to permit disengagement of the hook from the groove.

However, it is easy to break the locking mechanism and open the notebook computer since the locking mechanism is disposed on the side edge of the notebook computer.

SUMMARY OF THE INVENTION

Therefore, an object of the present invention is to provide a locking mechanism capable of alleviating the above mentioned drawbacks of the prior art.

Accordingly to an aspect of the present invention, a locking mechanism comprises a housing, a hinge, a fastening member, and an actuating member. The housing defines a receiving space therein and is formed with a through hole in spatial communication with the receiving space. The hinge includes a connecting support that is disposed in the receiving space of the housing and a rotary member that is adapted to be connected to the display screen, that is operable to pivot relative to the connecting support, and that has an engaging segment. The fastening member is disposed in the receiving space, is registered with the through hole, and is formed with an engaging slot for engaging the engaging segment of the rotary member. The actuating member removably extends into the through hole in the housing and is operable to actuate the fastening member to move between a locked position, where the engaging segment is engageable with the engaging slot, and an unlocked position, where the engaging segment and the engaging slot are non-engageable.

A pivotal movement of the rotary member relative to the connecting support is permitted when the fastening member is disposed proximate to the through hole at the unlocked position. The fastening member is spaced apart from the through hole when the fastening member is at the locked position.

The actuating member includes an operating portion accessible from the housing, and two hook elements protruding from the operating portion to extend into the through hole and capable of actuating the fastening member to move between the unlocked and locked positions.

The fastening member is formed with a coupling groove and an opening facing the through hole for permitting spatial communication between the coupling groove and the through hole. The hook elements are spaced apart from each other and each of the hook elements includes a resilient arm and a hook end that is engageable with the coupling groove. The actuating member is rotatable between an initial position, where the hook ends of the hook elements extend into and are not engaged with the coupling groove, and a coupled position, where the hook ends extend into and are engaged with the coupling groove.

The opening of the fastening member has an elongated first opening portion and two second opening portions. The elongated first opening portion has two opposite long edges that extend in a first direction, and has a dimension in the first direction greater than a distance between outer edges of the hook ends. The second opening portions are in spatial communication with the first opening portion, and are formed respectively on the two long edges of the first opening portion. A distance between the second opening portions is smaller than the distance between the outer edges of the hook ends. The hook ends of the hook elements correspond in position to the first opening portion when the actuating member is at the initial position, and the hook ends correspond in position to the second opening portions when the actuating member is at the coupled position.

The housing includes an elongated rib extending in a transverse direction. The connecting support of the hinge includes a stop wall and a second elongated rib that extends in the transverse direction and that has opposite ends, respectively terminating at the stop wall and corresponding in position to the first elongated rib. The fastening member is formed with an elongated sliding groove for slidably mating with the first and second elongated ribs. The fastening member is abutting against the stop wall when disposed at the locked position.

The housing includes a side wall formed with the through hole, and a peripheral wall extending from the side wall into the receiving space and surrounding the through hole. The first elongated rib is formed on the peripheral wall. The fastening member is partially surrounded by and abutting against the peripheral wall with the engaging slot being exposed outwardly of the peripheral wall when the fastening member is at the locked position.

The locking mechanism further comprises a removable lock device that has a hook element engageable with the coupling groove when the fastening member is at the unlocked position so as to maintain the fastening member at the unlocked position.

According to another aspect of this invention, there is provided an electronic device including a display screen and a locking mechanism. The locking mechanism comprises a housing, a hinge, a fastening member, and an actuating member. The housing defines a receiving space therein and is formed with a through hole in spatial communication with the receiving space. The hinge includes a connecting support that is disposed in the receiving space of the housing, and a rotary member that is adapted to be connected to the display screen, that is operable to pivot relative to the connecting support, and that has an engaging segment. The fastening member is disposed in the receiving space, is registered with the through hole, and is formed with an engaging slot for engaging the engaging segment of the rotary member. The actuating member removably extends into the through hole in the housing and is operable to actuate the fastening member to move between a locked position, where the engaging segment is engageable with the engaging slot, and an unlocked position, where the engaging segment and the engaging slot are non-engageable.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
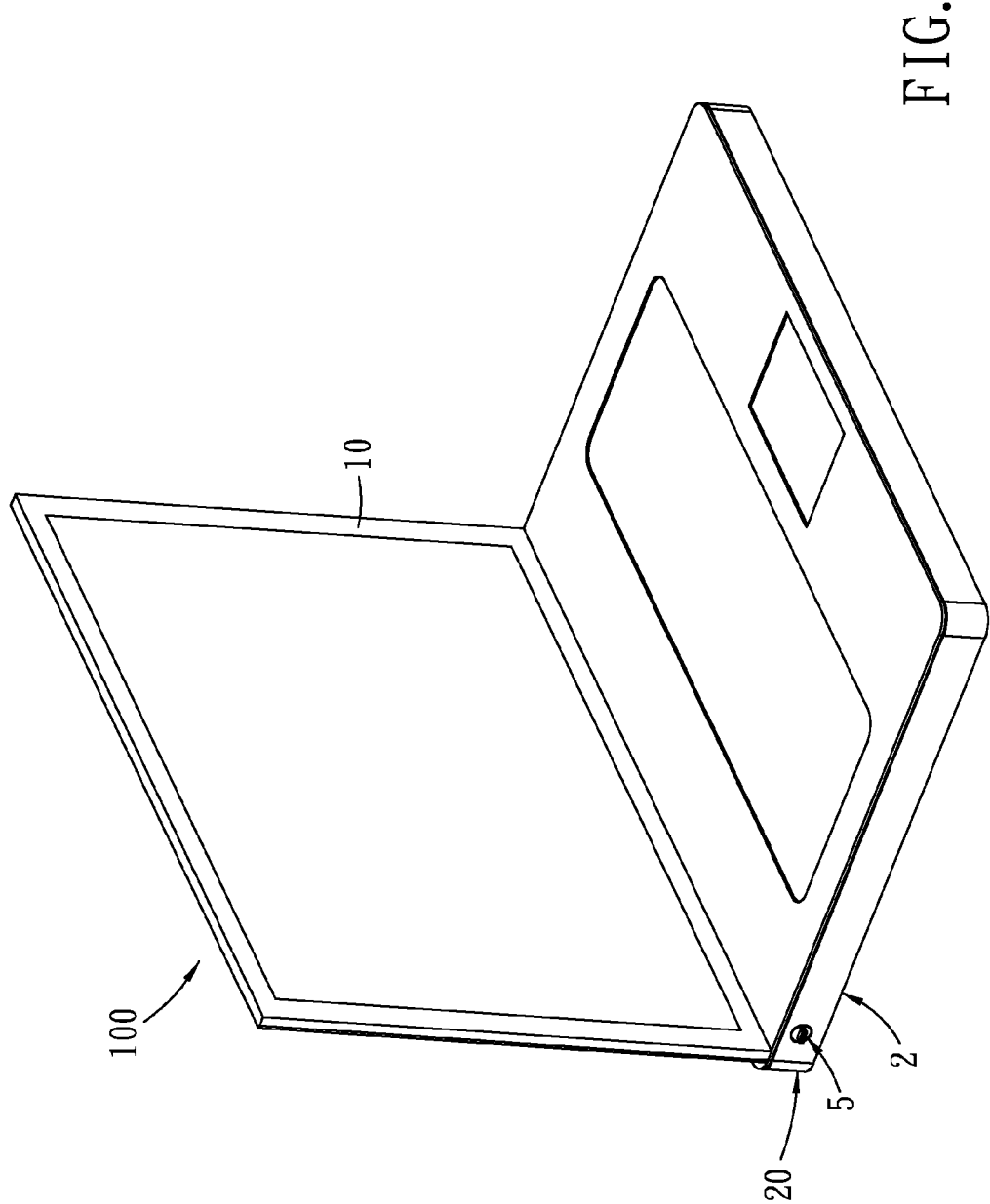
FIG. 1 is a schematic perspective view of an embodiment of an electronic device including a locking mechanism according to the present invention.
Figure 2:
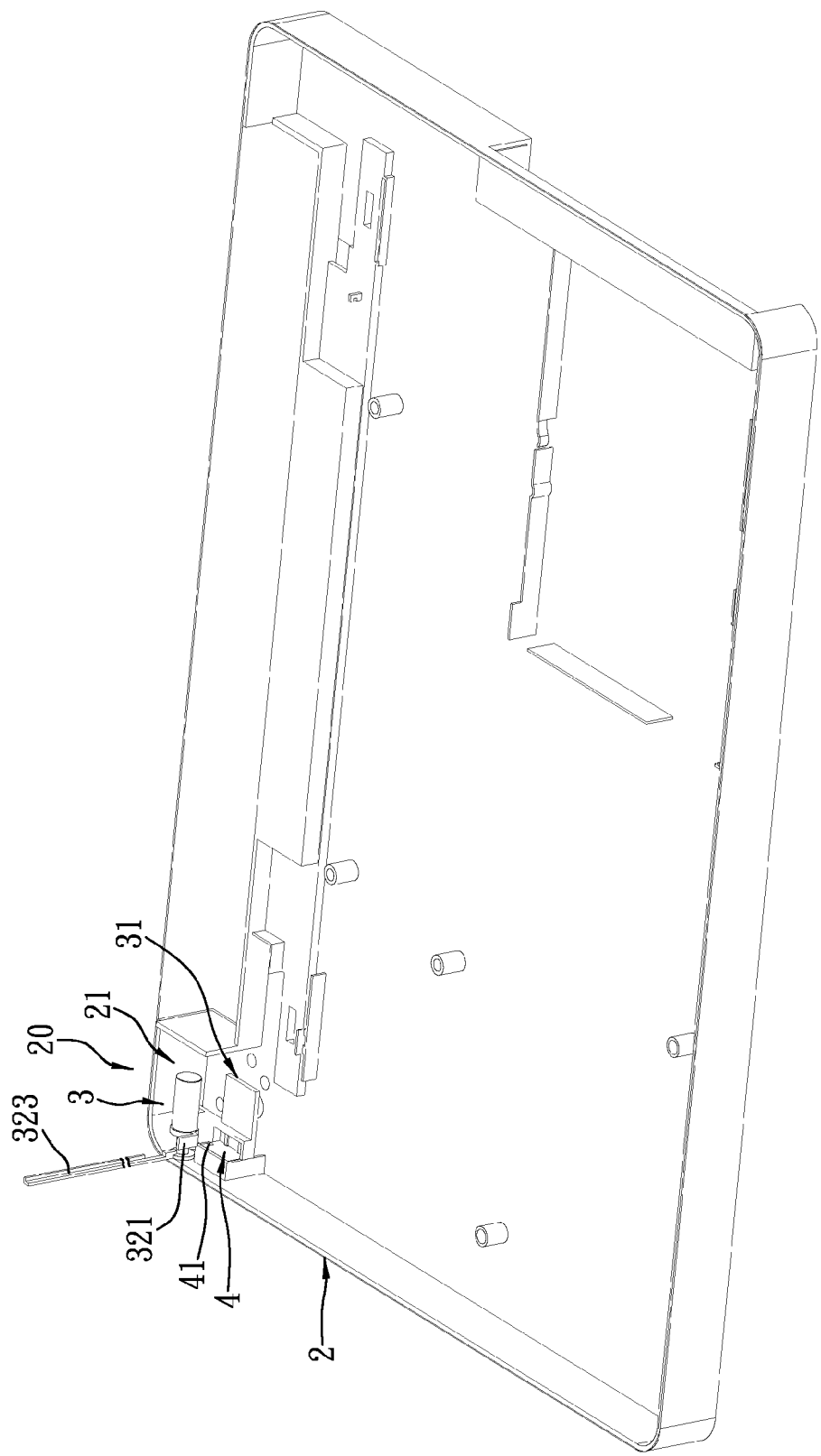
FIG. 2 is a schematic perspective view of the embodiment having the locking mechanism, parts of the electronic device being omitted.

Referring to FIGS. 1 and 2, an embodiment of an electronic device 100 of the present invention includes a display screen 10 and a locking mechanism 20. The electronic device 100 is a notebook computer in this embodiment, and can be a mobile phone or a personal digital assistant (FDA) in other embodiments.

Figure 3:
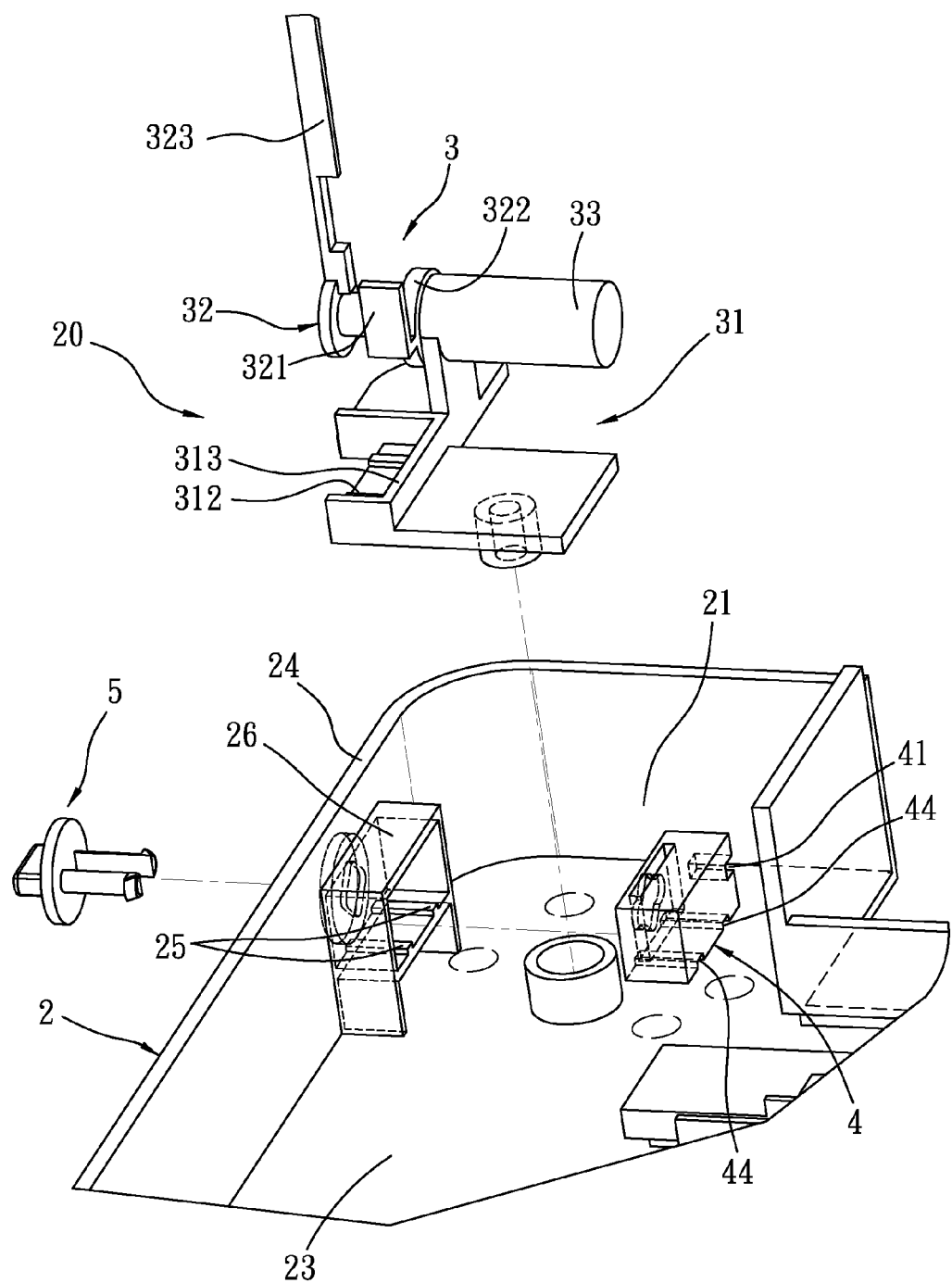
FIG. 3 is an exploded perspective view of the locking mechanism of the embodiment.
Figure 4:
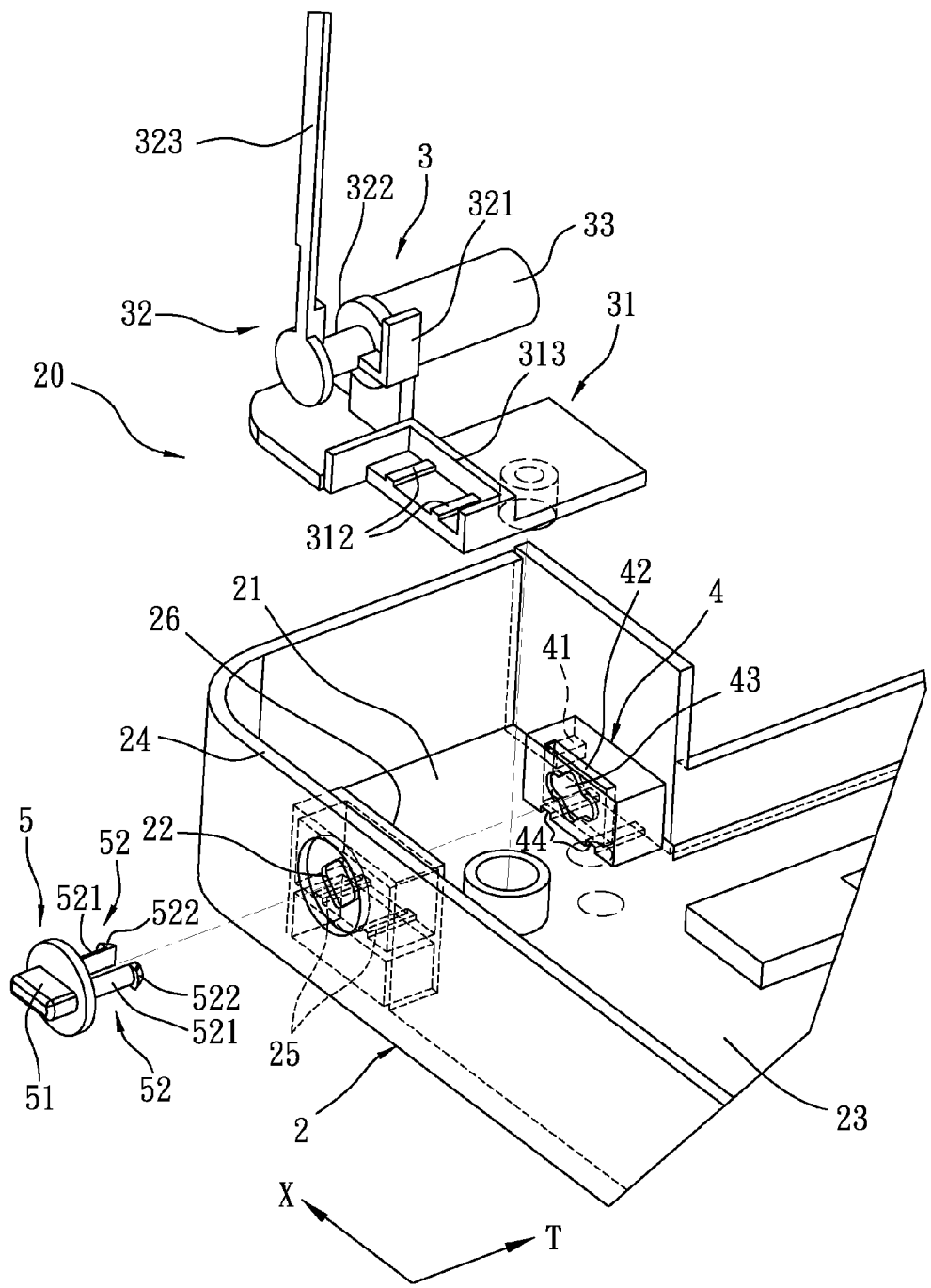
FIG. 4 is another exploded perspective view of the locking mechanism of the embodiment.
Figure 12:
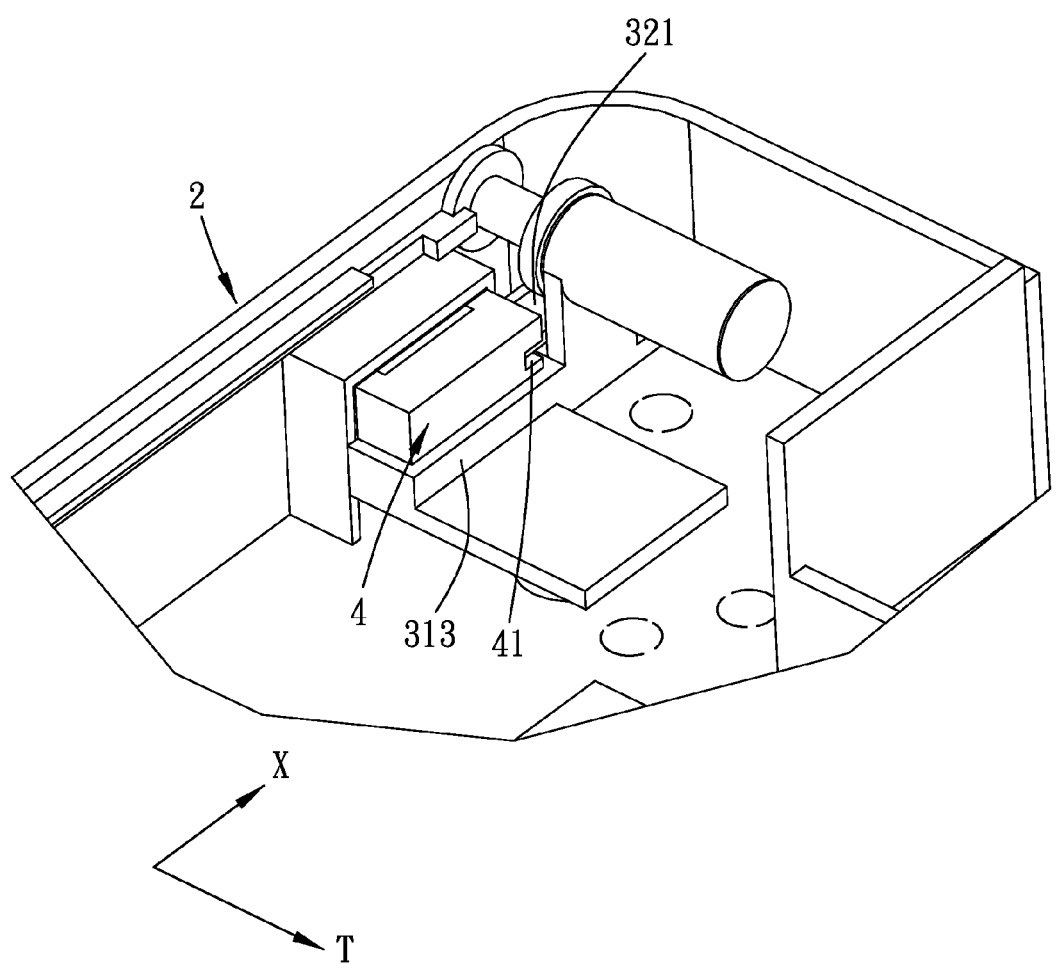
FIG. 12 is a fragmentary perspective view of the embodiment, illustrating the fastening member at the locked position.
Figure 13:
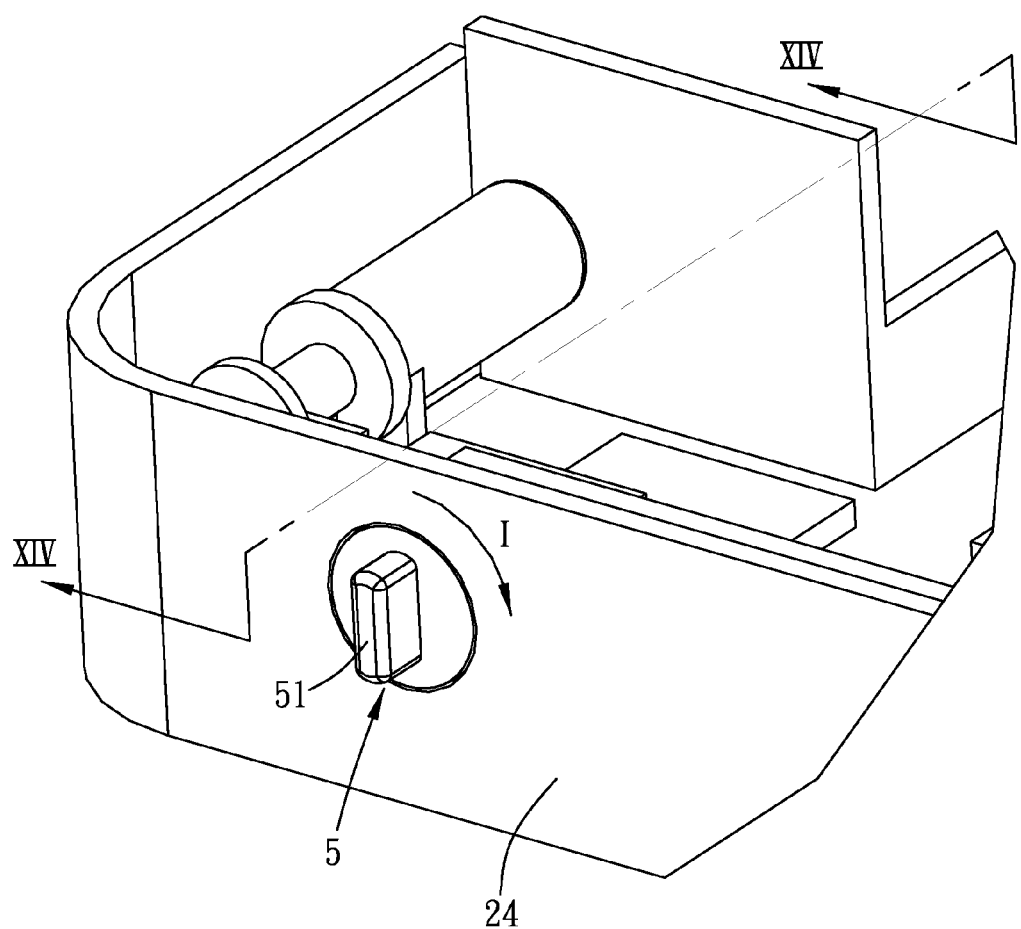
FIG. 13 is a fragmentary perspective view of the embodiment, illustrating the actuating member to be rotated from an initial position to a coupled position.

Further referring to FIGS. 3 and 4, the locking mechanism 20 comprises a housing 2, a hinge 3, a fastening member 4, and an actuating member 5. The housing 2 defines a receiving space 21 therein and is formed with a through hole 22 in spatial communication with the receiving space 21. The hinge 3 includes a connecting support 31 that is disposed in the receiving space 21 of the housing 2, and a rotary member 32 that is adapted to be connected to the display screen 10 (see FIG. 1), that is operable to pivot relative to the connecting support 31, and that has an engaging segment 321. The fastening member 4 is disposed in the receiving space 21, is registered with the through hole 22, and is formed with an engaging slot 41 for engaging the engaging segment 321 of the rotary member 32. The actuating member 5 removably extends into the through hole 22 in the housing 2, and is operable to actuate the fastening member 4 to slidably move between a locked position (see FIG. 12), where the engaging segment 321 can engage the engaging slot 41, and an unlocked position (see FIG. 9), where the engaging segment 321 cannot engage the engaging slot 41. It should be noted that movement of the fastening member 4 between the locked and unlocked positions can only be actuated through the actuating member 5 by a user, such that once engaged, the engaging segment 321 of the rotary member 32 which is connected to the display screen 10 and the engaging slot 41 of the fastening member 4 which is disposed in the housing 2 cannot be detached easily to enhance the security and stability of the locking mechanism 20.

The configuration and operation of the locking mechanism 20 will be described as follows. As can be seen in FIGS. 3 and 4, the housing 2 includes a base wall 23 and a side wall 24. The side wall 24 is formed with the through hole 22, extends upwardly from a periphery of the base wall 23, and cooperates with the base wall 23 to define the receiving space 21. The connecting support 31 of the hinge 3 is connected to the base wall 23 by way of engagement or threaded fastening. The rotary member 32 includes a positioning portion 322 pivoted relative to the connecting support 31 and a connecting stem 323 disposed co-rotatably on the positioning portion 322 and connected to the display screen 10 (as shown in FIG. 2). In this embodiment, the engaging segment 321 is formed integrally with the positioning portion 322, such that pivotal movement of the display screen 10 together with the connecting stem 323 relative to the connecting support 31 drives the positioning portion 322 and the engaging segment 321 to pivot relative to the connecting support 31. A torsion unit 33 is disposed on the connecting support 31 to exert a torsional force on the positioning portion 322 as a result of pivotal movement of the display screen 10 and the connecting stem 323 so as to maintain the display screen 10 at a selected position relative to the housing 2 unless an external force is applied thereon. It is noted that since the feature of the present invention does not reside in the specific construction of the torsion unit 33, which is known in the art, further details of the same are omitted herein for the sake of brevity.

Figure 8:
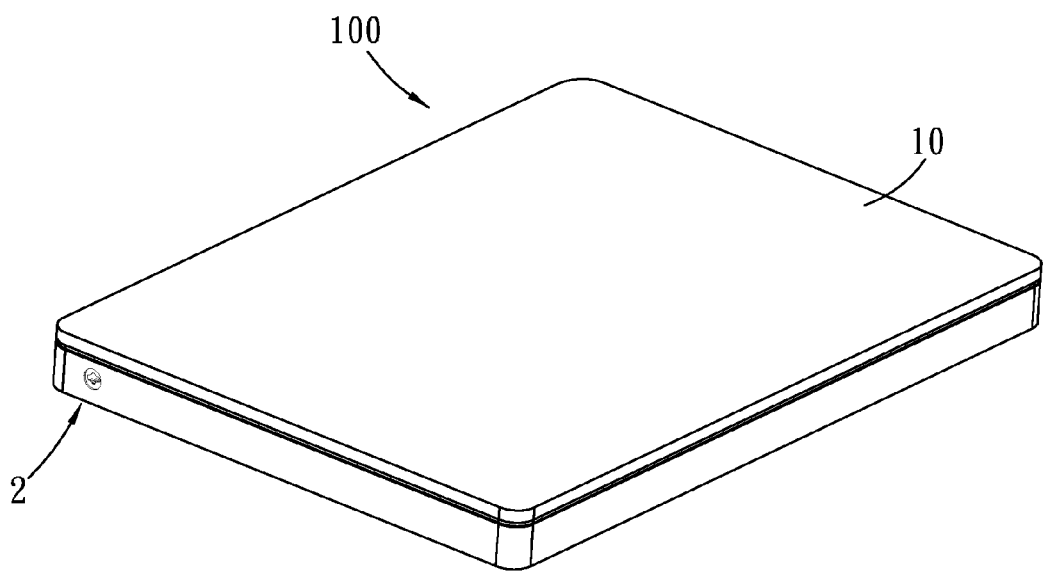
FIG. 8 is a schematic perspective view of the embodiment, illustrating a display screen of the electronic device being pivoted to a closed position.

The pivotal movement of the engaging segment 321 of the rotary member 32 relative to the connecting support 31 is permitted when the fastening member 4 is disposed at the unlocked position where the fastening member 4 is proximate to the through hole 22, such that the display screen 10 may be pivoted to overlay the housing 2 (see FIG. 8). At the same time, the engaging segment 321 of the rotary member 32 is moved to be registered with the engaging slot 41 of the fastening member 4 (see FIG. 9). The actuating member 5 of this embodiment includes an operating portion 51 accessible from the housing 2, and two hook elements 52 protruding from the operating portion 51 to extend into the through hole 22 and capable of actuating the fastening member 4 to move between the unlocked and locked positions. When the hook elements 52 of the actuating member 5 extend into the through hole 22 and abut against the fastening member 4, the fastening member 4 can be actuated to move toward and enable engagement of the engaging slot 41 with the engaging segment 321 so that the fastening member 4 is at the locked position, where the fastening member 4 is spaced apart from the through hole 22. It is noted that the operating portion 51 may be configured to abut against the side wall 24 of the housing 2 when the hook elements 52 actuate the fastening member 4 to the locked position.

Figure 5:
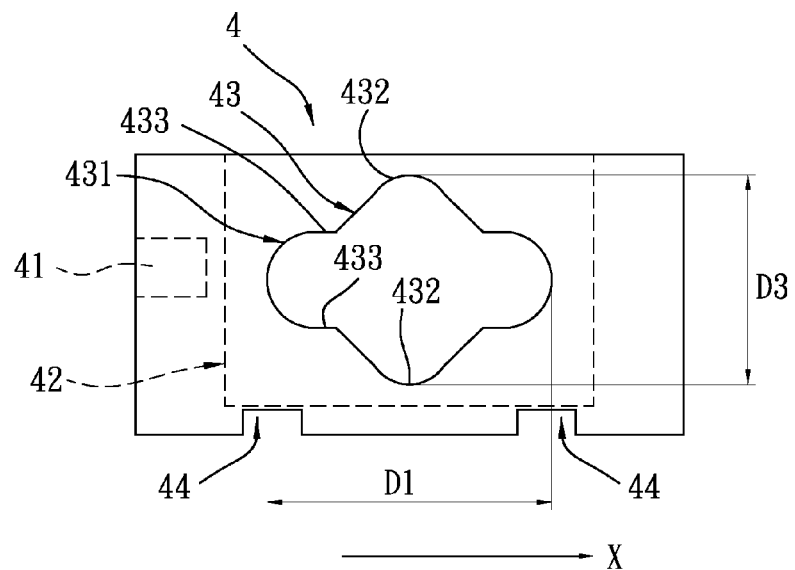
FIG. 5 is a schematic front view of a fastening member of the locking mechanism of the embodiment.
Figure 6:
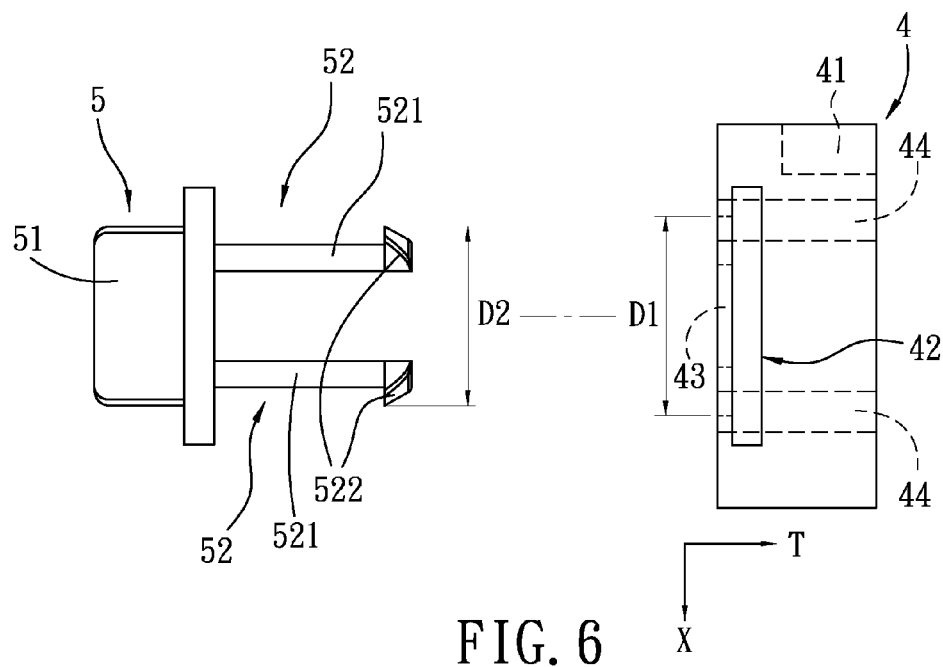
FIG. 6 is a schematic top view of the fastening member and an actuating member of the embodiment.
Figure 7:
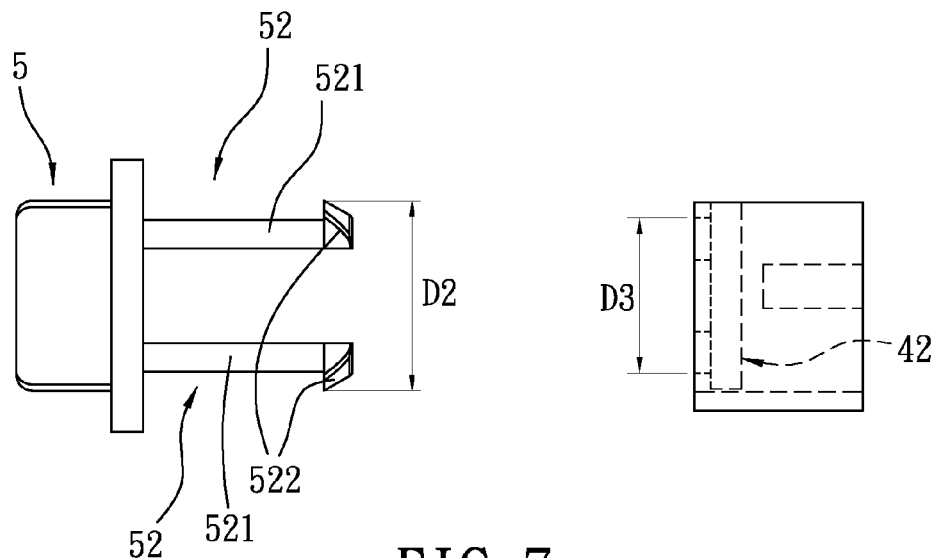
FIG. 7 is a schematic side view of the fastening member and the actuating member of the embodiment.
Figure 10:
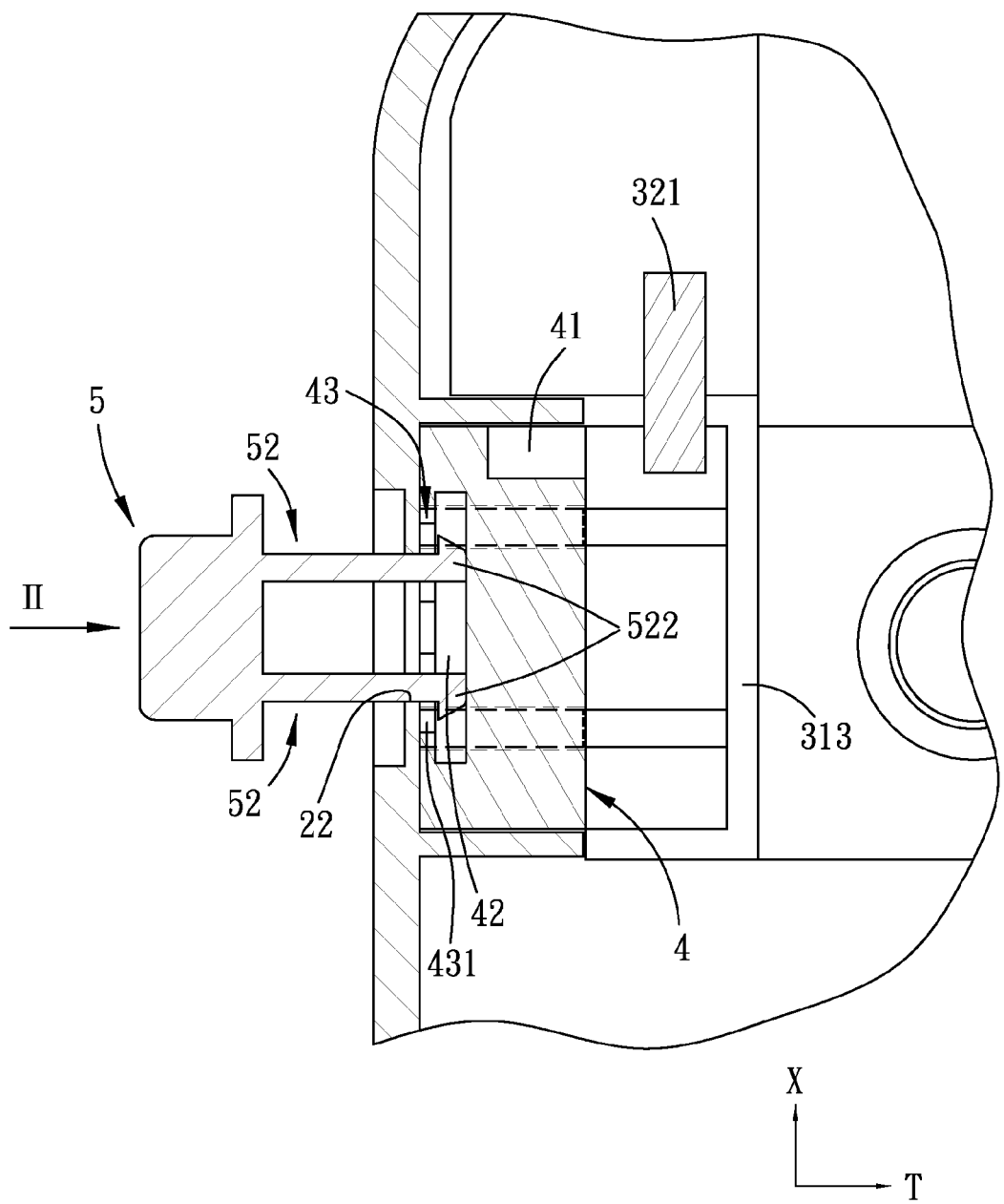
FIG. 10 is a fragmentary sectional view of the embodiment, illustrating the fastening member at the unlocked position.
Figure 14:
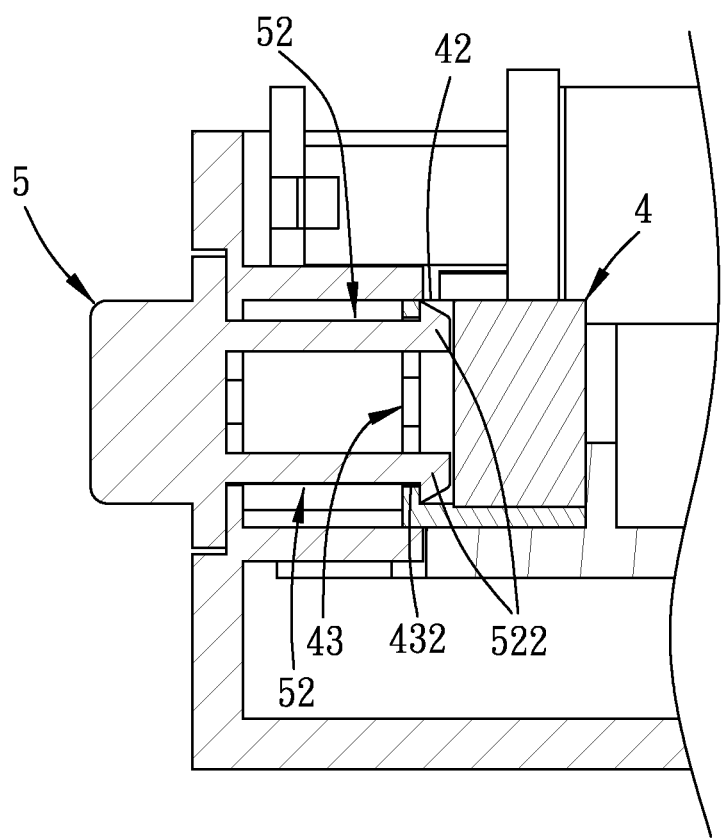
FIG. 14 is a sectional view taken along line XIV-XIV in FIG. 13, illustrating the actuating member at the coupled position.

Further referring to FIGS. 5 to 7, to enable the actuating member 5 to actuate the fastening member 4 to move not only from the unlocked position to the locked position, but also from the locked position to the unlocked position, in this embodiment, the fastening member 4 is formed with a coupling groove 42 and an opening 43 facing the through hole 22 for permitting spatial communication between the coupling groove 42 and the through hole 22. The hook elements 52 of the actuating member 5 are spaced apart from each other, and each of the hook elements 52 includes a resilient arm 521 and a hook end 522 that is engageable with the coupling groove 42 and that is formed on a tip of the resilient arm 521. The actuating member 5 is rotatable between an initial position (see FIG. 10), where the hook ends 522 extend into and not engaged with the coupling groove 42, and a coupled position (see FIG. 14), where the hook ends 522 extend into and are engaged with the coupling groove 42. The fastening member 4 is actuated by pushing the operating member 5 inwardly into the housing 2 to move away from the unlocked position regardless of whether the actuating member 5 is at the initial position or the coupled position. Once the fastening member 4 is moved to the locked position, the actuating member 5 may be removed from the coupling groove 42 through the opening 43 of the fastening member 4. To actuate the fastening member 4 to move from the locked position to the unlocked position, the operating portion 51 of the actuating member 5 is rotated to the coupled position when the hook elements 52 are extended into the coupling groove 42, so that the hook ends 522 of the hook elements 52 engage the coupling groove 42. The actuating member 5 is then pulled outwardly of the housing 2 together with the fastening member 4 to move the fastening member 4 to the unlocked position.

Furthermore, the opening 43 of the fastening member 4 has an elongated first opening portion 431 and two second opening portions 432. The elongated first opening portion 431 has two opposite long edges 433 that extend in a first direction (X), and has a dimension (D1) in the first direction (X) greater than a distance (D2) between outer edges of the hook ends 522 of the hook elements 52. As such, when arranged substantially along the first direction (X) in correspondence with the first opening portion 431, the hook ends 522 of the hook elements 52 are permitted to extend into the coupling groove 42 via the first opening portion 431 to push the fastening member 4 away from the unlocked position, and to be removed from the coupling groove 42 via the first opening portion 431 without moving the fastening member 4. At this time, the actuating member 5 is at the initial position. The second opening portions 432 are in spatial communication with the first opening portion 431 and are formed respectively on the two long edges 433 of the first opening portion 431. A distance (D3) between the second opening portions 432 is smaller than the distance (D2) between the outer edges of the hook ends 522 such that once disposed in the coupling groove 42, when the actuating member 5 is rotated from the initial position so the hook ends 522 of the hook elements 52 are arranged substantially in correspondence with the second opening portions 432, the hook ends 522 can engage the coupling groove 42 to enable movement of the fastening member 4 by the actuating member 5. At this time, the actuating member 5 is disposed at the coupled position.

Referring to FIGS. 3 and 4, the housing 2 further includes a pair of first elongated ribs 25 extending in a transverse direction (T) transverse to the first direction (X) and spaced apart from each other. The connecting support 31 of the hinge 3 includes a stop wall 313 and a pair of second elongated rib 312. Each of the second elongated ribs 312 extends in the transverse direction (T) and has opposite ends that respectively terminate at the stop wall 313 and correspond in position to a respective one of the first elongated ribs 25. The first elongated ribs 25 cooperate with the second elongated ribs 312 to define a track along which the fastening member 4 slidably moves. Accordingly, the fastening member 4 is formed with a pair of elongated sliding grooves 44 for slidably mating with the first and second elongated ribs 25, 312 so as to be movable between the unlocked and locked positions in the transverse direction (T) along the track defined cooperatively by the first and second elongated ribs 25, 312. Additionally, the stop wall 313 is provided to abut against and stop the fastening member 4 at the locked position.

The housing 2 further includes a peripheral wall 26 extending from the side wall 24 into the receiving space and surrounding the through hole 22. The first elongated ribs 25 are formed on an inner surface of the peripheral wall 26. The peripheral wall 26 surrounds and abuts against the fastening member 4 when the fastening member 4 is at the unlocked position. The fastening member 4 is partially surrounded by and abuts against the peripheral wall 26 with the engaging slot 41 being exposed outwardly of the peripheral wall 26 when the fastening member 4 is at the locked position. Consequently, the fastening member 4 is confined by the peripheral wall 26 to be slidable only in the transverse direction (T) along the first and second elongated ribs 25, 312, and is prevented from disengaging from the first and second elongated ribs 25, 312.

Figure 9:
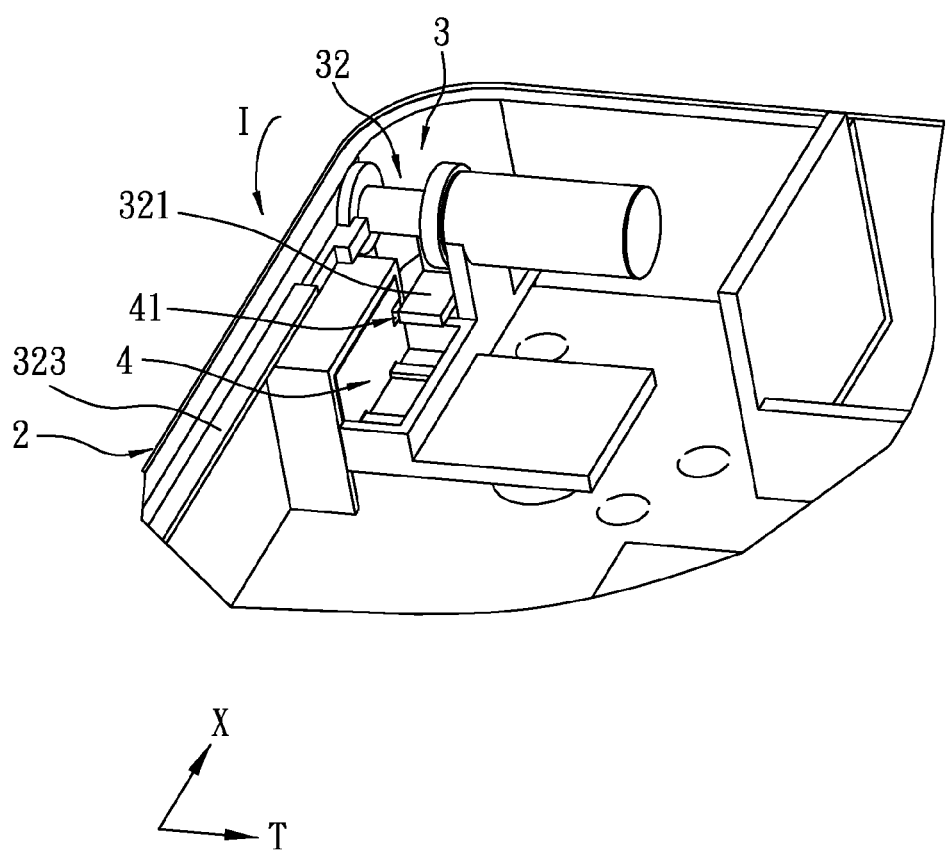
FIG. 9 is a fragmentary perspective view of the embodiment, illustrating the fastening member at an unlocked position.

As shown in FIGS. 8 and 9, when it is desired to lock the display screen 10 to the housing 2, the display screen 10 is first pivoted to a closed position on top of the housing 2 with the fastening member 4 disposed at the unlocked position, such that the engaging segment 321 of the rotary member 32 of the hinge 3 is simultaneously rotated in a direction as indicated by arrow (I) in FIG. 9 to be registered with the engaging slot 41 of the fastening member 4. Afterward, further referring to FIGS. 10 to 12, the hook elements 52 of the actuating member 5 are extended into and through the through hole 22 in a direction as indicated by arrow (II) in FIGS. 10 and 11, such that the hook ends 522 of the hook elements 52 extend into the coupling groove 42 via the first opening portion 431 of the opening 43. The actuating member 5 is further pushed in the direction indicated by the arrow (II) to actuate the fastening member 4 to move in the transverse direction (T) along the track defined by the first and second elongated ribs 25, 312 until the fastening member 4 abuts against the stop wall 313 to hinder further movement of the actuating member 5 and the fastening member 4 in the direction indicated by the arrow (II). At this time, the fastening member 4 is at the locked position where the engaging segment 321 of the rotary member 32 engages the engaging slot 41, and the display screen 10 is locked to the housing 2. Since the dimension (D1) of the first opening portion 431 of the opening 43 in the first direction (X) is greater than the distance (D2) between the outer edges of the hook ends 522 (see FIG. 6), the hook elements 52 of the actuating member 5 may be pulled outwardly of the housing 2 via the first opening portion 431 and the through hole 22 in a direction opposite to the direction indicated by the arrow (II) as long as the actuating member 5 is at the initial position while the fastening member 4 is maintained at the locked position to keep the display screen 10 at the close position (see FIG. 8). The electronic device 100 is prevented from unauthorized use since the engagement between the fastening member 4 and the rotary member 32 of the hinge 3 cannot be broken easily as a result of the fastening member 4 being distal from the through hole 22 of the housing 2 and concealed in the housing 2 at the locked position.

Figure 11:
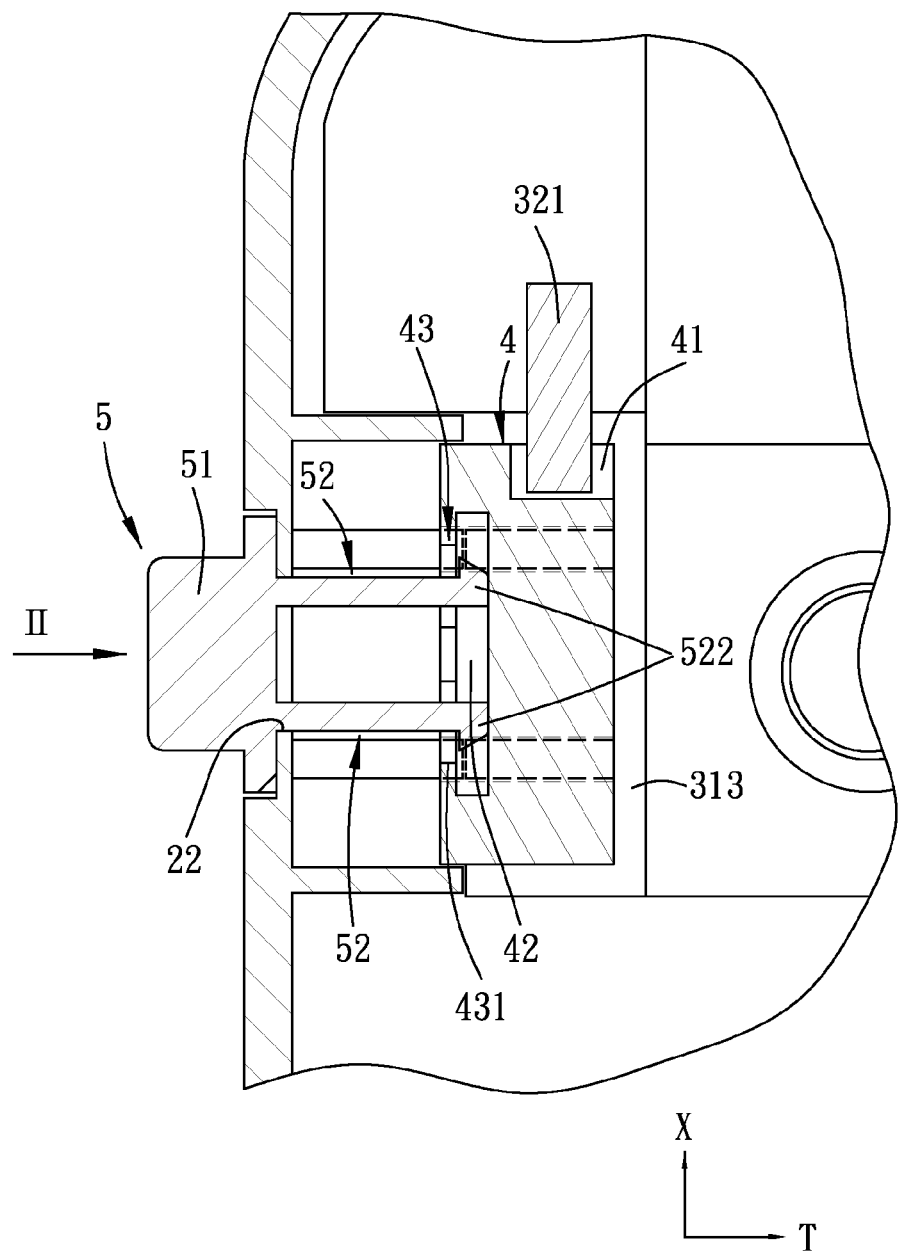
FIG. 11 is another fragmentary sectional view of the embodiment, illustrating the fastening member at a locked position.

Referring to FIGS. 11, and 13 to 15, when it is desired to unlock the display screen 10 from the housing 2, the hook elements 52 of the actuating member 5 are first inserted into the through hole 22 in a direction indicated by the arrow (II) in FIG. 11 such that the hook ends 522 of the hook elements 52 extend into the coupling groove 42 via the first opening portion 431 of the opening 43. Subsequently, the operating portion 51 of the actuating member 5 is rotated in the direction as indicated by the arrow (I) in FIG. 13 for about 90 degrees from the initial position to the coupled position where the hook ends 522 engage the coupling groove 42 (see FIG. 14).

Figure 15:
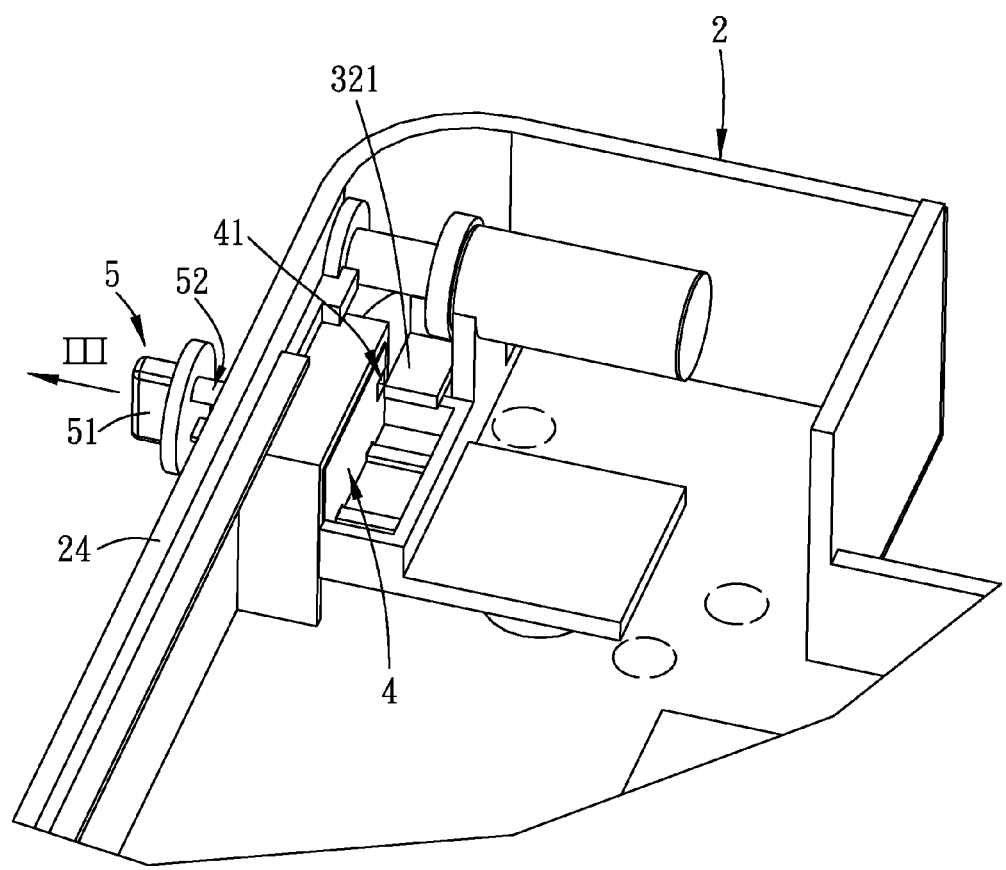
FIG. 15 is a fragmentary perspective view of the embodiment, illustrating the fastening member at the locked position.

Next, the actuating member is pulled by the operating portion 51 outwardly of the housing 2 in a direction as indicated by arrow (III) in FIG. 15, brining along the fastening member 4 until the fastening member 4 abuts against the side wall 24 of the housing 2 at the unlocked position where the engaging segment 321 disengages from the engaging slot 41. Therefore, the display screen 10 (shown in FIG. 1) is freed from the housing 2 and can be pivoted to open for subsequent operation of the electronic device 100 by the user.

Figure 16:
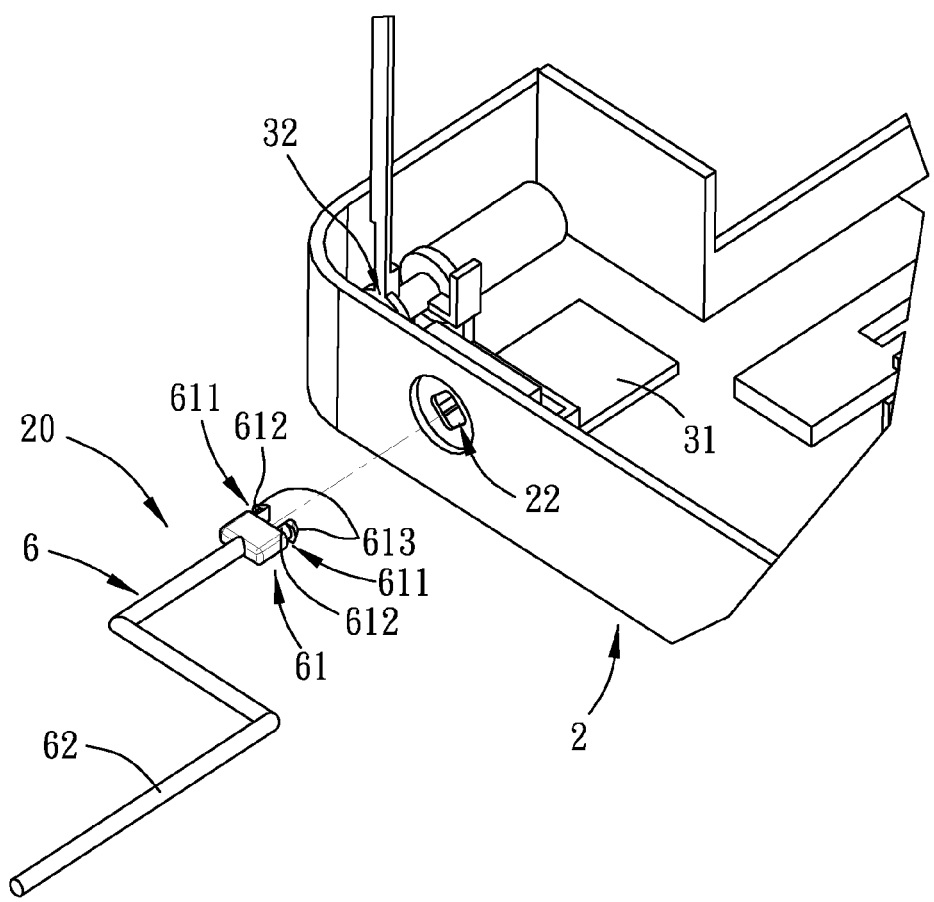
FIG. 16 is a fragmentary partly exploded view of the embodiment, illustrating a lock device of the embodiment.
Figure 17:
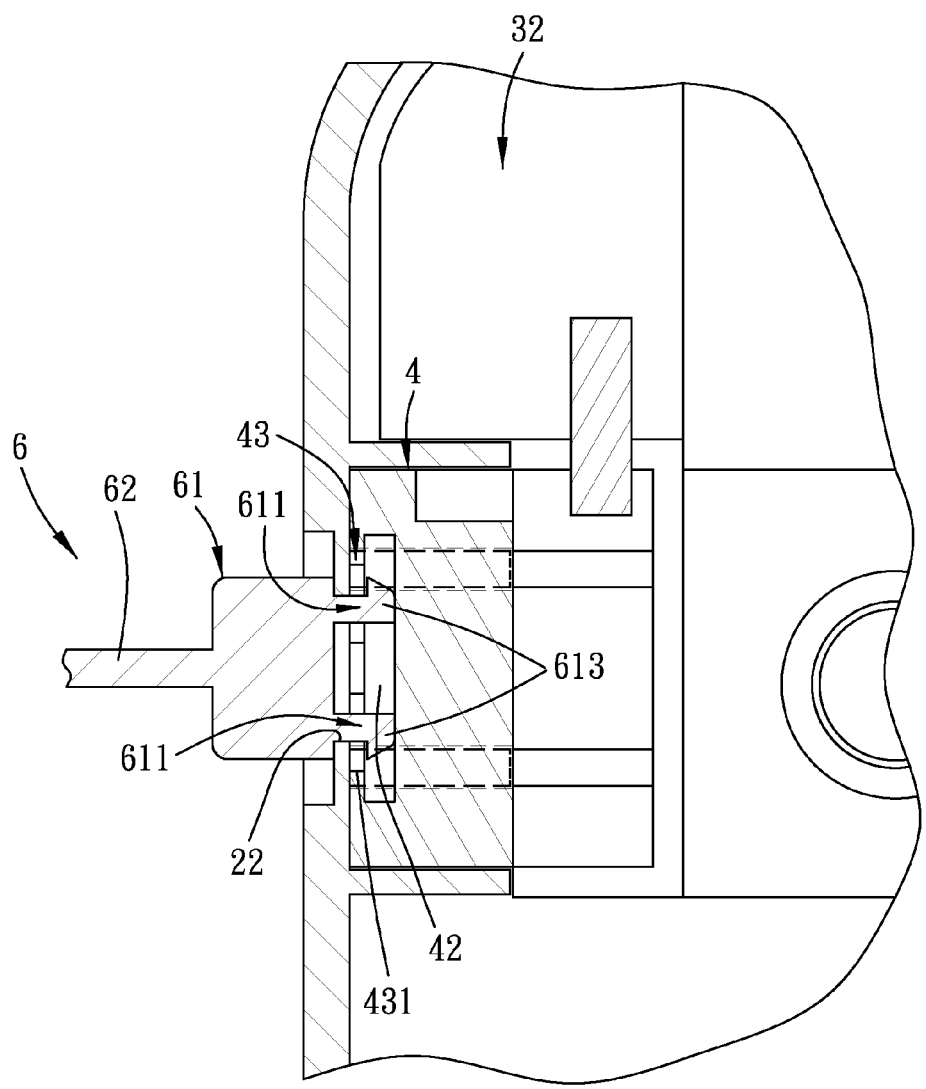
FIG. 17 is a fragmentary sectional view of the embodiment, illustrating the lock device at an initial position.
Figure 18:
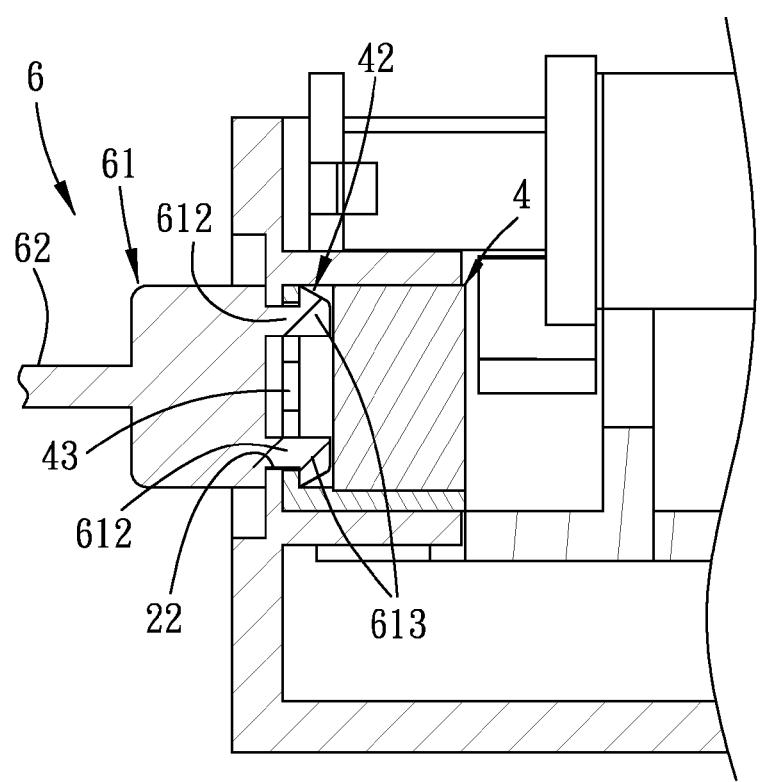
FIG. 18 is another fragmentary sectional view of the embodiment, illustrating the lock device at a coupled position.

In another application of the present invention, referring to FIGS. 16 to 18, the locking mechanism 20 further comprises a removable lock device 6 that includes a steel wire 62 having one end fixed to a furniture (not shown), e.g. an exhibition table, and a locking unit 61 connected to the other end of the steel wire 62. The locking unit 61 includes two hook elements 611 having a structure similar to that of the hook elements 52 of the actuating member 5, except that the length of the hook elements 611 is shorter than that of the hook elements 52. Each of the hook elements 611 has a resilient arm 612 and a hook end 613 that is formed on a tip of the resilient arm 612 and that is engageable with the coupling groove 42. The locking unit 61 is brought to extend into the through hole 22 such that the hook ends 613 of the hook elements 611 are extended into the coupling groove 42 via the first opening portion 431 of the opening 43 when the fastening member 4 is disposed proximate to the through hole 22 at the unlocked position. Afterwards, the locking unit 61 is rotated about 90 degrees, such that the hook ends 613 engage the coupling groove 42 to thereby maintain the fastening member 4 at the unlocked position and permit pivotal movement of the rotary member 32 together with the display screen 10 (shown in FIG. 1) relative to the connecting support 31 and the housing 2. Consequently, the electronic device 100 is fixed to the furniture through the steel wire 62 and can be prevented from being easily stolen.

To sum up, by virtue of the locking mechanism 20 of the electronic device 100 according to the present invention, the fastening member 4 is actuated to move between the locked and unlocked positions by the actuating member 5. Additionally, since the fastening member 4 and the rotary member 32 are disposed in the receiving space 21 of the housing 2 and due to the specific manner of engagement between the actuating member 5 and the fastening member 4, it is relatively difficult to break the engagement between the fastening member 4 and the rotary member 32 without the actuating member 5 as compared to the conventional locking mechanism.

While the present invention has been described in connection with what is considered the most practical and embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A locking mechanism adapted for locking a display screen of an electronic device, the locking mechanism comprising:
    a housing defining a receiving space therein and formed with a through hole in spatial communication with said receiving space;
    a hinge including a connecting support that is disposed in said receiving space of said housing, and a rotary member that is adapted to be connected to the display screen, that is operable to pivot relative to said connecting support, and that has an engaging segment;
    a fastening member disposed in said receiving space, registered with said through hole, and formed with an engaging slot for engaging said engaging segment of said rotary member; and
    an actuating member removably extending into said through hole in said housing and operable to actuate said fastening member to move between a locked position, where said engaging segment is engageable with said engaging slot, and an unlocked position, where said engaging segment and said engaging slot are non-engageable.

2. The locking mechanism according to claim 1, wherein pivotal movement of said rotary member relative to said connecting support is permitted when said fastening member is disposed proximate to said through hole at the unlocked position, and said fastening member is spaced apart from said through hole when said fastening member is at the locked position.

3. The locking mechanism according to claim 2, wherein said actuating member includes an operating portion accessible from said housing, and two hook elements protruding from said operating portion to extend into said through hole and capable of actuating said fastening member to move between the unlocked and locked positions.

4. The locking mechanism according to claim 3, wherein said fastening member is formed with a coupling groove and an opening facing said through hole for permitting spatial communication between said coupling groove and said through hole, said hook elements being spaced apart from each other and each including a resilient arm and a hook end that is engageable with said coupling groove, said actuating member being rotatable between an initial position, where said hook ends of said hook elements extend into and are not engaged with said coupling groove, and a coupled position, where said hook ends extend into and are engaged with said coupling groove.

5. The locking mechanism according to claim 4, wherein said opening of said fastening member has:
   an elongated first opening portion having two opposite long edges that extend in a first direction, and having a dimension in the first direction greater than a distance between outer edges of said hook ends; and
   two second opening portions in spatial communication with said first opening portion, and formed respectively on said two long edges, a distance between said second opening portions being smaller than the distance between said outer edges of said hook ends; and
   wherein said hook ends of said hook elements correspond in position to said first opening portion when said actuating member is at the initial position, and said hook ends correspond in position to said second opening portions when said actuating member is at the coupled position.

6. The locking mechanism according to claim 5, wherein said housing includes an elongated rib extending in a transverse direction, said connecting support of said hinge including a stop wall and a second elongated rib that extends in the transverse direction and that has opposite ends, respectively terminating at said stop wall and corresponding in position to said first elongated rib, said fastening member being formed with an elongated sliding groove for slidably mating with said first and second elongated ribs, said fastening member abutting against said stop wall when disposed at the locked position.

7. The locking mechanism according to claim 6, wherein said housing includes a side wail formed with said through hole, and a peripheral wall extending from said side wall into said receiving space and surrounding said through hole, said first elongated rib being formed on said peripheral wall, said fastening member being partially surrounded by and abutting against said peripheral wall with said engaging slot being exposed outwardly of said peripheral wall when said fastening member is at the locked position.

8. The locking mechanism according to claim 4, further comprising a removable lock device that has a hook element engageable with said coupling groove when said fastening member is at the unlocked position so as to maintain said fastening member at the unlocked position.

9. An electronic device including:
   a display screen;
   a locking mechanism comprising:
      a housing defining a receiving space therein and formed with a through hole in spatial communication with said receiving space;
      a hinge including a connecting support that is disposed in said receiving space of said housing, and a rotary member that is adapted to be connected to the display screen, that is operable to pivot relative to said connecting support, and that has an engaging segment;
      a fastening member disposed in said receiving space, registered with said through hole, and formed with an engaging slot for engaging said engaging segment of said rotary member; and
      an actuating member removably extending into said through hole in said housing and operable to actuate said fastening member to move between a locked position, where said engaging segment is engageable with said engaging slot, and an unlocked position, where said engaging segment and said engaging slot are non-engageable.

10. The electronic device according to claim 9, wherein pivotal movement of said rotary member relative to said connecting support is permitted when said fastening member is disposed proximate to said through hole at the unlocked position, and said fastening member is spaced apart from said through hole when said fastening member is at the locked position.

11. The electronic device according to claim 10, wherein said actuating member includes an operating portion accessible from said housing, and two hook elements protruding from said operating portion to extend into said through hole and capable of actuating said fastening member to move between the unlocked and locked positions.

12. The electronic device according to claim 11, wherein said fastening member is formed with a coupling groove and an opening facing said through hole for permitting spatial communication between said coupling groove and said through hole, said hook elements being spaced apart from each other and each including a resilient arm and a hook end that is engageable with said coupling groove, said actuating member being rotatable between an initial position, where said hook ends of said hook elements extend into and are not engaged with said coupling groove, and a coupled position, where said hook ends extend into and are engaged with said coupling groove.

13. The electronic device according to claim 12, wherein said opening of said fastening member has:
   an elongated first opening portion having two opposite long edges that extend in a first direction, and having a dimension in the first direction greater than a distance between outer edges of said hook ends; and
   two second opening portions in spatial communication with said first opening portion, and formed respectively on said two long edges, a distance between said second opening portions being smaller than the distance between said outer edges of said hook ends; and
   wherein said hook ends of said hook elements correspond in position to said first opening portion when said actuating member is at the initial position, and said hook ends of said hook elements correspond in position to said second opening portions when said actuating member is at the coupled position.

14. The electronic device according to claim 13, wherein said housing includes an elongated rib extending in a transverse direction, said connecting support of said hinge including a stop wall and a second elongated rib that extends in the transverse direction and that has opposite ends, respectively terminating at said stop wall and corresponding in position to said first elongated rib, said fastening member being formed with an elongated sliding groove for slidably mating with said first and second elongated ribs, said fastening member abutting against said stop wall when disposed at the locked position.

15. The electronic device according to claim 14, wherein said housing includes a side wall formed with said through hole, and a peripheral wall extending from said side wall into said receiving space and surrounding said through hole, said first elongated rib being formed on said peripheral wall, said fastening member being partially surrounded by and abutting against said peripheral wall with said engaging slot being exposed outwardly of said peripheral wall when said fastening member is at the locked position.

16. The electronic device according to claim 13, further comprising are movable lock device that has a hook element engageable with said coupling groove when said fastening member is at the unlocked position so as to maintain said fastening member at the unlocked position.

\* \* \* \* \*